Jan. 1, 1924. 1,479,758

H. W. TUCKER

COFFEE DRIPPER

Filed Dec. 12, 1922

Inventor
Hal W. Tucker
By E. E. Overholt
Attorney.

Patented Jan. 1, 1924.

1,479,758

UNITED STATES PATENT OFFICE.

HAL W. TUCKER, OF SAN ANTONIO, TEXAS.

COFFEE DRIPPER.

Application filed December 12, 1922. Serial No. 606,484.

*To all whom it may concern:*

Be it known that I, HAL W. TUCKER, a citizen of the United States, residing at San Antonio, in the county of Bexar and State of Texas, have invented certain new and useful Improvements in Coffee Drippers, of which the following is a specification.

My invention relates to coffee drippers.

My object is to provide a device of this character adapted to be removably received into the top of a coffee pot or other receptacle in which coffee is to be made, in such a way that the lid of the pot can be placed on the dripper, and the pot thereby kept as completely closed against the escape of steam as when the pot is used without the dripper.

Another object is to so arrange the parts that the dripper is held against lateral play at the top of the receptacle.

Still another object is to provide a device of this character with means for conveniently lifting it in and out of the coffee receptacle without burning the hands of the operator, said means being preferably outside the lid and arranged to fold down out of the way when the dripper is not in use.

A further object is to provide the device with means for preventing the coffee from running over the top of the dripper as it is poured back and forth from the receptacle into the dripper in the making.

Other objects will appear in the subjoined description.

An important feature of the invention consists of a cloth bag held between an inner and an outer ring, the outer ring being provided with a folding bail for handling the device, and the inner ring having means for preventing the fluid from running over the top of the dripper when poured rapidly thereinto.

The invention consists in certain novel features of construction and arrangement of parts, as will be hereinafter described and claimed, reference being had to the accompanying drawings, in which:—

Figure 1:
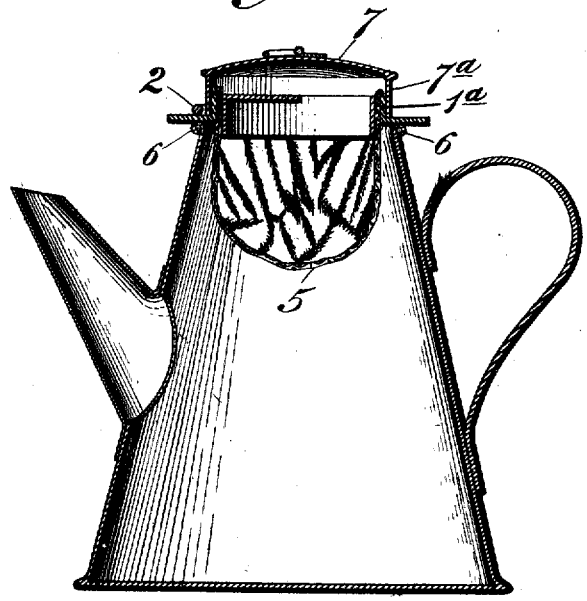
Figure 2:
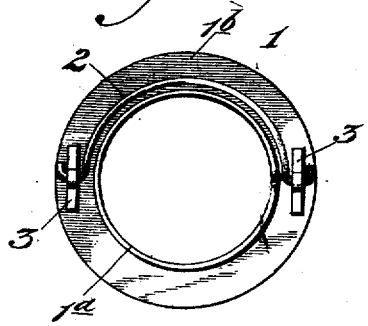
Figure 3:
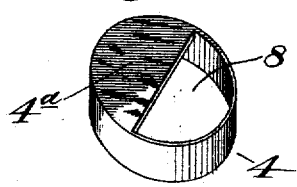
Figure 4:
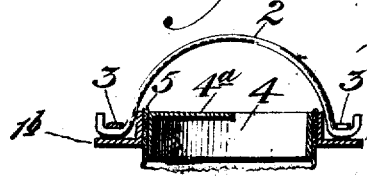

Fig. 1 is a sectional view showing a coffee pot provided with my improved dripper. Fig. 2 is a top plan view of the outer ring or band showing the folding bail in its inoperative position. Fig. 3 is a perspective of the inner ring or band; and Fig. 4 is a sectional view showing the folding bail raised up in operative position.

The numeral 1 indicates the outer band consisting of the vertical portion or band proper $1^a$ and the annular horizontally disposed flange $1^b$ which carries a concentric bail 2 pivotally mounted at its ends in bearings 3 and adapted to fold down into flat engagement with said flange. The bearings 3 are secured to the band $1^b$ in any suitable manner, as by soldering. The numeral 4 indicates the inner band which is preferably broader than the outer band, and forms a short cylinder, as it were, with its upper end closed at one side by the semicircular portion $4^a$. The inner band 4 is of slightly less diameter than the outer band 1, so that the open end of the cloth bag 5 is tightly received between the two bands.

The annular flange $1^b$ of the outer ring rests on the top bead 6 of the coffee pot, and the vertical portion $1^a$ of said band is of a diameter to be snugly received into the lid 7 of the coffee pot, so that the lid which closes the coffee pot without the dripper will also close it with the dripper. The bail 2 is of a diameter to come outside the cylindrical portion $7^a$ of the lid, so as not to interfere with the lid coming into close contact with the flange $1^b$ and thereby making a perfect closure for the coffee pot when the dripper is in use. The inner band 4 preferably projects down below the annular flange $1^b$ to form a stop to prevent the dripper from having lateral play on top of the coffee pot, as may be seen from Fig. 1 of the drawings. In the figure there is a slight space shown between the bag 5 and the bead 6 at the top of the pot, but that grows out of the fact that the bands and the lid and the bag are all shown many times thicker than they really are, in order to make the showing in the drawings plain. It will at once be seen that if the metal could be shown its proper thickness in proportion to the scale upon which the drawings are made, the bag 5 would be almost touching the bead 6, so that the device would barely have play enough in the top of the coffee pot to permit it to be put in and taken out easily. When the coffee pot is hot this is done by means of the bail 2, which, when in use is raised into the position illustrated in Fig. 4. At other times the bail lies down in flat engagement with the flange $1^b$ out of the way, and yet on the outside of the lid where it is easily accessible and can be raised to operative position without removing the lid, whereby when the dripper is removed from a pot of steaming coffee, the lid serves as a shield to keep the steam from rising and burning the hand that holds the bail.

When, in the process of making, the coffee is poured back and forth from the pot and then into the bag 5 again, the semicircular portion 4ª of the inner band prevents the coffee from running over the top of the bag when the coffee is poured very rapidly thereinto. This however, is not the only function of the plate 4ª, for it will be seen that even when the lid 7 is removed from the pot, this plate will still prevent the column of rising steam from directly striking the hand of the operator, if he takes hold of the end of the bail adjacent said plate, the plate of course, being disposed relatively to the bail with its central radial line in approximate alinement with the pivoted ends of the bail. The other function of the plate 4ª just above referred to, and an additional function yet to be referred to are not affected by the condition of the plate relatively to the axis of rotation of the bale.

From the arrangement shown, it will be seen that the bag may be very easily and conveniently removed for washing, or to be replaced by another.

In operation, the parts are assembled as already described, with the open end of the bag held between the two bands, and the dripper placed in the top of the pot. The ground coffee is poured into the bag 5 through the opening 8 of the inner ring, and the dripper is closed by placing thereon the lid 7 of the pot, so that the coffee is entirely cut off from contact with the outer air, and is exposed to the steam on top of the pot.

When the coffee is poured out of the pot and then back into the bag 5 through the opening 8 of the inner band to bring the fluid into vigorous contact with the ground coffee in the bag, the semicircular plate 4ª keeps the coffee from running over the top of the dripper thereby carrying some of the grounds down into the pot. When the coffee has been sufficiently brewed, the bail 2 is raised up into the position illustrated in Fig. 4, and the dripper may be lifted from the coffee pot thereby, the lid serving to prevent the hand of the operator from getting burned by steam rising from the steaming hot coffee grounds in the bag 5. If the lid is removed first, the plate 4ª still serves to measurably protect the hand of the operator from getting burned, as is fully pointed out above. When the lid is removed from the dripper it is again placed on the pot leaving the clear drip coffee in the pot ready to be poured out for use, with all the grounds removed with the bag.

The inner band 4 is forced out of the band 1, which permits the easy removal of the bag 5 for washing. The plate 4ª of the inner band forms a bearing surface easily engaged by the fingers of the operator, making it easy to force the inner band through the outer band in engaging or releasing the bag.

Having now described my invention, what I claim as new and desire to protect by Letters Patent is:—

1. A device of the character described comprising an outer and an inner band and a reticulated bag held between them, the outer band having an annular flange for supporting the device on top of a coffee pot, and the inner band having an inwardly extending top plate at one side thereof; and a folding bail pivotally connected to said annular flange of the outer band at diametrically opposite sides thereof for handling the device.

2. A dripper for cooperation with a coffee pot having a lid adapted to fit inside the top thereof; and a dripper, comprising an outer band adapted to be received into said lid and provided with an annular outwardly extending flange adapted to rest on top of the coffee pot, and provided on its upper side with a pivoted bail outside the lid; a reticulated bag received into said outer band; and an inner band received into the open mouth of said bag and adapted to press the bag into close engagement with the outer band to support the bag between the two, said inner band extending downwardly below the outer band to form a stop to hold the device against lateral movement on the coffee pot.

3. A dripper for cooperation with a coffee pot, comprising an outer band having an annular flange for resting on top of the coffee pot to support the device thereon; a pivoted bail secured to said flange for lifting the device on and off the coffee pot; an inner band; and a reticulated bag having its open mouth held between said bands, said inner bag being provided with a cover for one side thereof, said cover portion being disposed adjacent one of the pivoted ends of the bail to prevent the column of steam rising from the pot from striking said portion of the bail.

4. A dripper for cooperation with a coffee pot, comprising an outer and an inner band and a reticulated bag having its open mouth held between said bands, the outer band having an annular flange for supporting the device on top of a coffee pot, and the inner band being provided with a covering for one side thereof to partially close the open mouth of the bag at that side; and a handle for lifting the device off the pot when hot, said handle being secured to the device adjacent the periphery thereof and extending inwardly above said cover portion of the inner band in position to shield the hand of the operator from the column of steam rising from the bag.

5. A dripper for cooperation with a coffee pot, comprising an outer and an inner band and a reticulated bag having its open mouth held between said bands, the outer band having an annular flange for supporting the device on top of a coffee pot, and the inner band extending downwardly below the outer band into the top of the pot, and being provided with a cover for one side thereof to partially close the open mouth of the bag at that side; and a handle for lifting the device off the pot when hot, said handle being secured to the device adjacent the periphery thereof and extending inwardly above said cover portion of the inner band in position to shield the hand of the operator from the column of steam rising from the bag.

In testimony whereof I affix my signature.

HAL W. TUCKER.